# (12) United States Patent
Kreidler et al.

(10) Patent No.: US 10,594,174 B2
(45) Date of Patent: Mar. 17, 2020

(54) TOOL AND METHOD FOR USE IN ASSEMBLING A STATOR ASSEMBLY OF AN ELECTRIC MACHINE

(71) Applicant: Regal Beloit America, Inc., Beloit, WI (US)

(72) Inventors: Jason Jon Kreidler, Sheboygan, WI (US); William J. Conway, Wausau, WI (US); Wesley K. Anderson, Cedarburg, WI (US)

(73) Assignee: Regal Beloit America, Inc., Beloit, WI (US)

( * ) Notice: Subject to any disclaimer, the term of this patent is extended or adjusted under 35 U.S.C. 154(b) by 215 days.

(21) Appl. No.: 15/471,142

(22) Filed: Mar. 28, 2017

(65) Prior Publication Data

US 2017/0264148 A1    Sep. 14, 2017

Related U.S. Application Data

(62) Division of application No. 13/569,038, filed on Aug. 7, 2012, now Pat. No. 9,641,029.

(60) Provisional application No. 61/624,051, filed on Apr. 13, 2012.

(51) Int. Cl.
*H02K 15/00* (2006.01)
*H02K 1/14* (2006.01)
*H02K 3/52* (2006.01)

(52) U.S. Cl.
CPC .............. *H02K 1/148* (2013.01); *H02K 3/522* (2013.01); *H02K 2213/03* (2013.01); *Y10T 29/49009* (2015.01); *Y10T 29/5192* (2015.01)

(58) Field of Classification Search
CPC .... H02K 1/148; H02K 3/522; H02K 2213/03; H02K 5/04; H02K 5/08; Y10T 29/49009; Y10T 29/5192; Y10T 29/53143; Y10T 29/49012; Y10T 29/49826
USPC ........ 29/596, 33 L, 428, 592, 598, 609, 732, 29/750
See application file for complete search history.

(56) References Cited

U.S. PATENT DOCUMENTS 3,909,902 A    10/1975  Peters
4,389,584 A     6/1983  Burns
5,163,856 A *  11/1992  McGaffigan ......... B23K 3/0475
                                                219/616

(Continued)

FOREIGN PATENT DOCUMENTS

CN    201153223 Y    11/2008
CN    201360206 Y    12/2009

(Continued)

OTHER PUBLICATIONS

China First Office Action for related application 201310296255.2 dated Jul. 6, 2016; 12 pp.

(Continued)

*Primary Examiner* — Thiem D Phan
(74) *Attorney, Agent, or Firm* — Armstrong Teasdale LLP

(57) ABSTRACT

An end cap for use with a stator assembly is provided. The end cap includes a tooth portion, a yoke portion, and a lip. The tooth portion includes a first end and an opposite second end and the yoke portion is formed at the first end of the tooth portion. The yoke portion includes at least one arm that extends from the tooth portion. The lip is defined along at least one of the tooth portion and the at least one arm portion.

14 Claims, 12 Drawing Sheets

(56) References Cited

U.S. PATENT DOCUMENTS

| | | |
|---|---|---|
| 5,306,976 A | 4/1994 | Beckman |
| 6,002,190 A | 12/1999 | Kieffer |
| 6,018,207 A | 1/2000 | Saban et al. |
| 6,163,949 A | 12/2000 | Neuenschwander |
| 6,192,575 B1 | 2/2001 | Neuenschwander |
| 6,509,665 B1 | 1/2003 | Nishiyama et al. |
| 6,523,247 B2 | 2/2003 | Mirpuri et al. |
| 6,744,166 B2 | 6/2004 | Harter et al. |
| 6,847,285 B2 | 1/2005 | Sirois et al. |
| 6,984,913 B2 | 1/2006 | Neuenschwander |
| 7,062,841 B2 | 6/2006 | Neuenschwander |
| 7,086,317 B2 | 8/2006 | Bender |
| 7,111,380 B2 | 9/2006 | Sheeran et al. |
| 7,382,075 B2 | 6/2008 | Wang et al. |
| 7,414,347 B2 | 8/2008 | Wang et al. |
| 7,471,025 B2 | 12/2008 | Sheeran et al. |
| 7,586,231 B2 | 9/2009 | Wang et al. |
| 7,709,992 B2 | 5/2010 | Hussey et al. |
| 7,752,733 B1 | 7/2010 | Badgerow |
| 2001/0006597 A1 | 7/2001 | Neuenschwander |
| 2004/0084988 A1 | 5/2004 | Sheeran et al. |
| 2006/0071569 A1 | 4/2006 | Stewart et al. |
| 2007/0114877 A1 | 5/2007 | Wang et al. |
| 2008/0129142 A1 | 6/2008 | Sheeran et al. |
| 2009/0058206 A1 | 3/2009 | Bremner |
| 2010/0127587 A1 | 5/2010 | Qin et al. |
| 2010/0181853 A1 | 7/2010 | Wong et al. |
| 2011/0025163 A1* | 2/2011 | Shiobara .............. H02K 3/18 310/198 |
| 2011/0037352 A1 | 2/2011 | Lin et al. |
| 2011/0140567 A1 | 6/2011 | Horst et al. |
| 2011/0291519 A1 | 12/2011 | Modi et al. |
| 2012/0161571 A1 | 6/2012 | Fukasaku et al. |

FOREIGN PATENT DOCUMENTS

| | | |
|---|---|---|
| JP | S61231868 A | 10/1986 |
| JP | 2003111329 A | 4/2003 |
| JP | 2007082276 A | 3/2007 |
| JP | 2010288405 A | 12/2010 |
| JP | 2011135640 A | 7/2011 |
| KR | 101002958 B1 | 12/2010 |

OTHER PUBLICATIONS

China First Office Action for related application 201310252692.4 dated Jun. 27, 2016; 10 pp.

* cited by examiner

TOOL AND METHOD FOR USE IN ASSEMBLING A STATOR ASSEMBLY OF AN ELECTRIC MACHINE

CROSS REFERENCE TO RELATED APPLICATIONS

This application is a divisional application and claims priority to U.S. patent application Ser. No. 13/569,038 filed Aug. 7, 2012, which claims priority to U.S. Provisional Application No. 61/624,051 filed Apr. 13, 2012, which are both hereby incorporated by reference in its entirety.

BACKGROUND OF THE INVENTION

The embodiments described herein relate generally to an electric machine and, more particularly, to a stator assembly included within the electric machine that includes an end cap for insulating stator laminations.

In at least some known salient-pole-type electrical machines, a stator core is formed from stator laminations. Magnet wire is wound around portions of the stator core to form a stator winding. End caps may be used to insulate end turns of the magnet wire from an electric ground. At least some known stator laminations are formed by punching a linear strip of stator teeth from a sheet of stock material. The stator laminations are stacked to form the stator core, which includes a plurality of stator segments. The end caps are positioned such that magnet wire may be wound about the stator segments. The end caps are configured to provide electrical insulation between the stator laminations and the magnet wire winding.

In at least one known stator assembly, the stator core includes openings configured to receive features included in the end cap. The features are used to secure the end caps to the stator core such that the end caps are properly aligned with stator core teeth. However, the openings in the stator core cause undesirable electromagnetic characteristics.

In at least another known stator assembly, each end cap includes a post or hook that protrudes away from the end cap. A tie-down winds between adjacent stator segments and engages with the hooks of adjacent end caps to hold the adjacent stator segments together during assembly. However, using a tie-down to engage posts of adjacent stator segments does not insulate the stator core from the magnet wire.

BRIEF DESCRIPTION OF THE INVENTION

In one aspect, a method of assembling a stator assembly is provided. The stator assembly includes a plurality of stator segments, each stator segment including at least a portion of a core and at least one end cap. The core includes a tooth having at least one end face and each end cap includes a yoke portion and a tooth portion. The stator assembly is assembled using a tool that includes a first member and a second member extending therefrom. The method includes engaging the tool with the at least one end cap, aligning the at least one end cap with the at least one end face using the tool, and winding wire about the core tooth such that the at least one end cap is positioned between the at least one end face and the wire.

In another aspect, a tool for use in assembling a stator assembly of an electrical machine is provided. The tool includes an elongated body, a plurality of first members extending from the elongated body, and a plurality of second members extending from the elongated body. The plurality of first members and the plurality of second members are aligned with each other along a length of the elongated body such that member pairs, each including a first member and a second member, are defined along the length of the elongated body.

DETAILED DESCRIPTION OF THE INVENTION

The methods and systems described herein relate generally to a stator assembly included within an electric machine. More specifically, the stator assembly includes an end cap that facilitates reducing electrical conductive transfer between a stator winding and a stator core. Furthermore, the end caps include a lip feature formed therein that is configured to engage a corresponding insulation member such that each end cap is held in a desired positioned against respective stator laminations until wire has been wound about the stator segment.

More specifically, each end cap includes lip features that are configured to engage corresponding cuffs of an insulation member. The lip features allow the cuffs to latch onto the end cap, thereby allowing the cuffs to hold the end cap in a desired position. Moreover, wire wound about the core laminations may lead to mechanical stress induced upon the end caps and the insulation member. More specifically, the wire applies the greatest amount of mechanical stress at the corners of the stator laminations. In some embodiments, to provide additional strength, the cuffed features are located adjacent to areas of the stator laminations that are subject to the greatest mechanical stress. In addition, the lip features facilitate maintaining the insulation member in place adjacent to a stator segment. As such, both the end cap and the insulation member remain stationary as wire is wound about each stator segment.

In the exemplary embodiment, the end caps are constructed of a non-conductive material that has sufficient strength to withstand the forces required to wind the wire about the stator segments while maintaining electrical clearances. In the exemplary embodiment, the end caps are not overmolded and do not significantly reduce the slot area between adjacent stator segments. As such, the amount of copper wire that may fit into the slot area is not significantly reduced by the end caps.

As described in more detail below, the end caps have a substantially rounded shape such that wire may be more easily wound about each stator segment. Generally, known end caps have sharp corners that require a greater force to be applied to wind wire against the end caps. Winding wire about corners of the end caps requires bending the wire into a rectangular configuration. Furthermore, abrupt changes in curvature of the end caps lead to distortion of the wire such that a reduced cross-sectional area of wire winding forms a hot spot. As such, current embodiments of the present invention facilitate reducing the force required to wind wire about each stator segment when compared to non-arcuate end caps.

Figure 1:
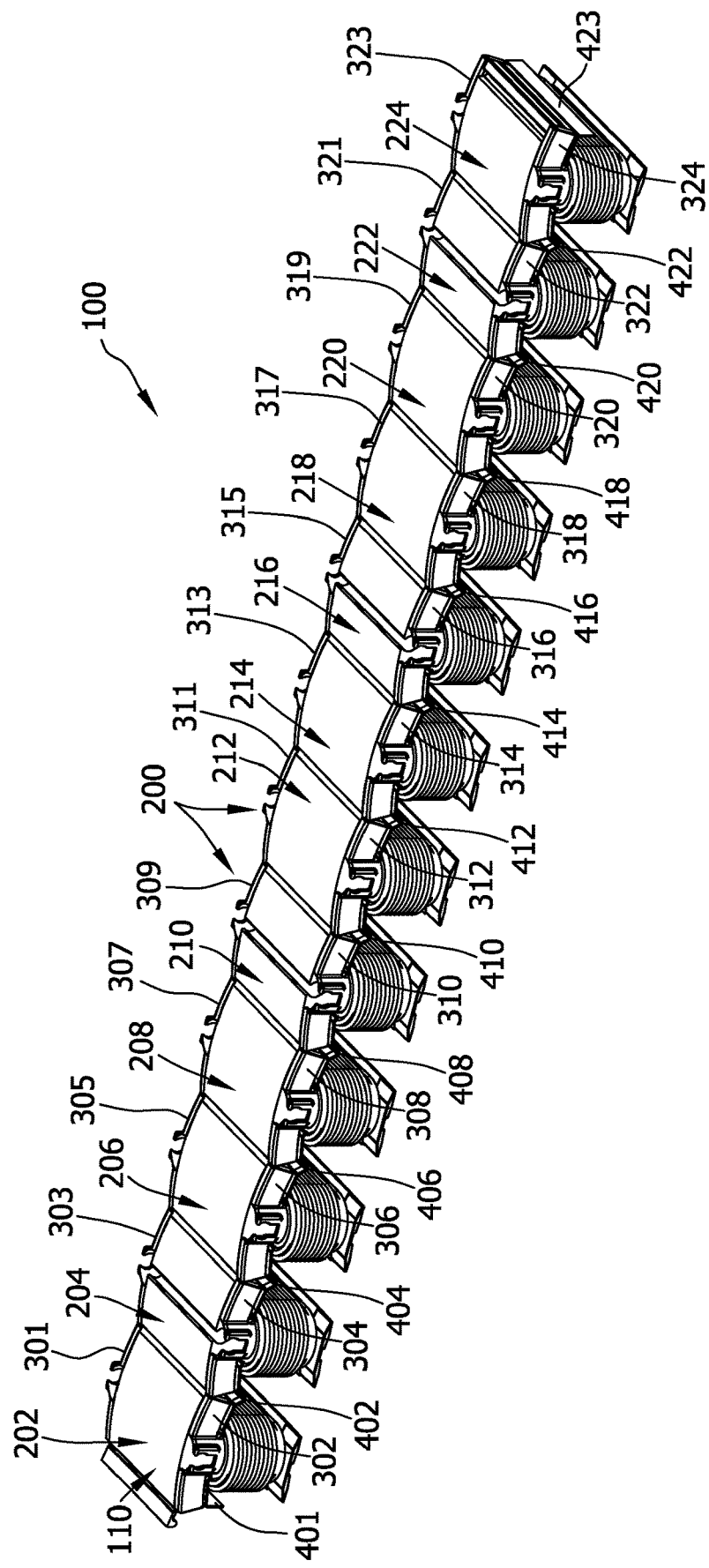
FIG. 1 is a perspective view of an exemplary stator assembly.

FIG. 1 is a perspective view of an exemplary stator assembly 100. In the exemplary embodiment, stator assembly 100 is configured for use in, for example, a brushless direct current motor, a permanent magnet alternating current (PMAC) motor, and/or any other suitable electrical machine. In the exemplary embodiment, stator assembly 100 includes a stator core 110, a plurality of end caps 300, and a plurality of insulation members 400. Stator assembly 100 may include a plurality of stator segments 200, for example, a first stator segment 202, a second stator segment 204, a third stator segment 206, a fourth stator segment 208, a fifth stator segment 210, a sixth stator segment 212, a seventh stator segment 214, an eighth stator segment 216, a ninth stator segment 218, a tenth stator segment 220, an eleventh stator segment 222, and a twelfth stator segment 224. Although illustrated as including twelve stator segments, stator assembly 100 may include any suitable number of stator segments such that stator assembly 100 functions as described herein.

In some embodiments, core 110 may be formed as a stack of flat laminations (not shown) made of a highly magnetically permeable material, or core 110 may be a solid core. The plurality of laminations that form core 110 may be either interlocked or loose.

In some embodiments, the plurality of end caps 300 includes first end caps 301, 303, 305, 307, 309, 311, 313, 315, 317, 319, 321, and 323, and second end caps 302, 304, 306, 308, 310, 312, 314, 316, 318, 320, 322, and 324. In the exemplary embodiment, each stator segment includes a first end cap and a second end cap. For example, third stator segment 206 includes first end cap 305 and second end cap 306, fourth stator segment 208 includes first end cap 307 and second end cap 308, fifth stator segment 210 includes first end cap 309 and second end cap 310, and sixth stator segment 212 includes first end cap 311 and second end cap 312. Furthermore, in some embodiments, the plurality of insulation members 400 includes insulation members 402, 404, 406, 408, 410, 412, 414, 416, 418, 420, and 422.

Figure 2:
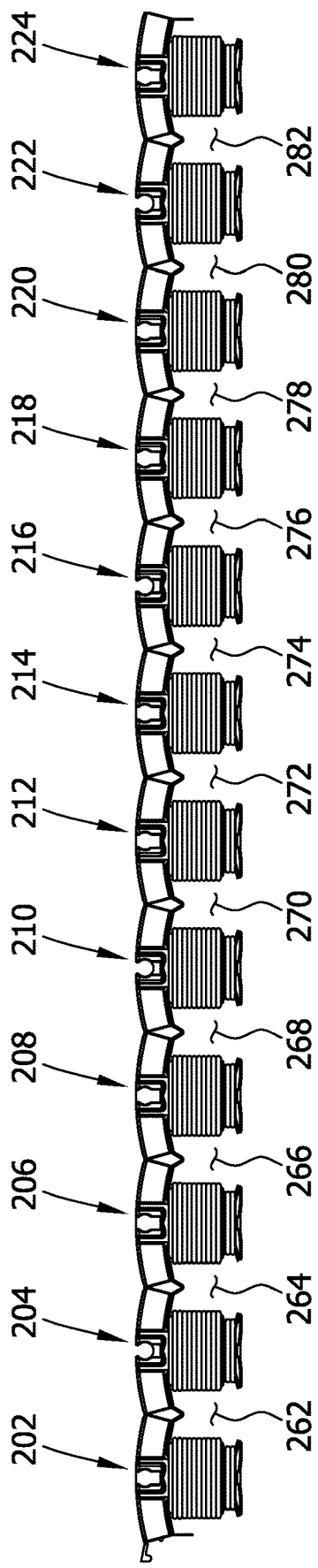
FIG. 2 is a perspective front view of the stator assembly shown in FIG. 1.

FIG. 2 is a perspective front view of stator assembly 100. In the exemplary embodiment, a plurality of slots are defined between adjacent stator segments 200. For example, a first slot 262 is defined between stator segments 202 and 204, a second slot 264 is defined between stator segments 204 and 206, a third slot 266 is defined between stator segments 206 and 208, a fourth slot 268 is defined between stator segments 208 and 210, a fifth slot 270 is defined between stator segments 210 and 212, a sixth slot 272 is defined between stator segments 212 and 214, a seventh slot 274 is defined between stator segments 214 and 216, an eighth slot 276 is defined between stator segments 216 and 218, a ninth slot 278 is defined between stator segments 218 and 220, a tenth slot 280 is defined between stator segments 220 and 222, and an eleventh slot 282 is defined between stator segments 222 and 224. Accordingly, as explained in more detail below, an insulation member 400 may be positioned within each slot to substantially insulate core 110.

Figure 3:
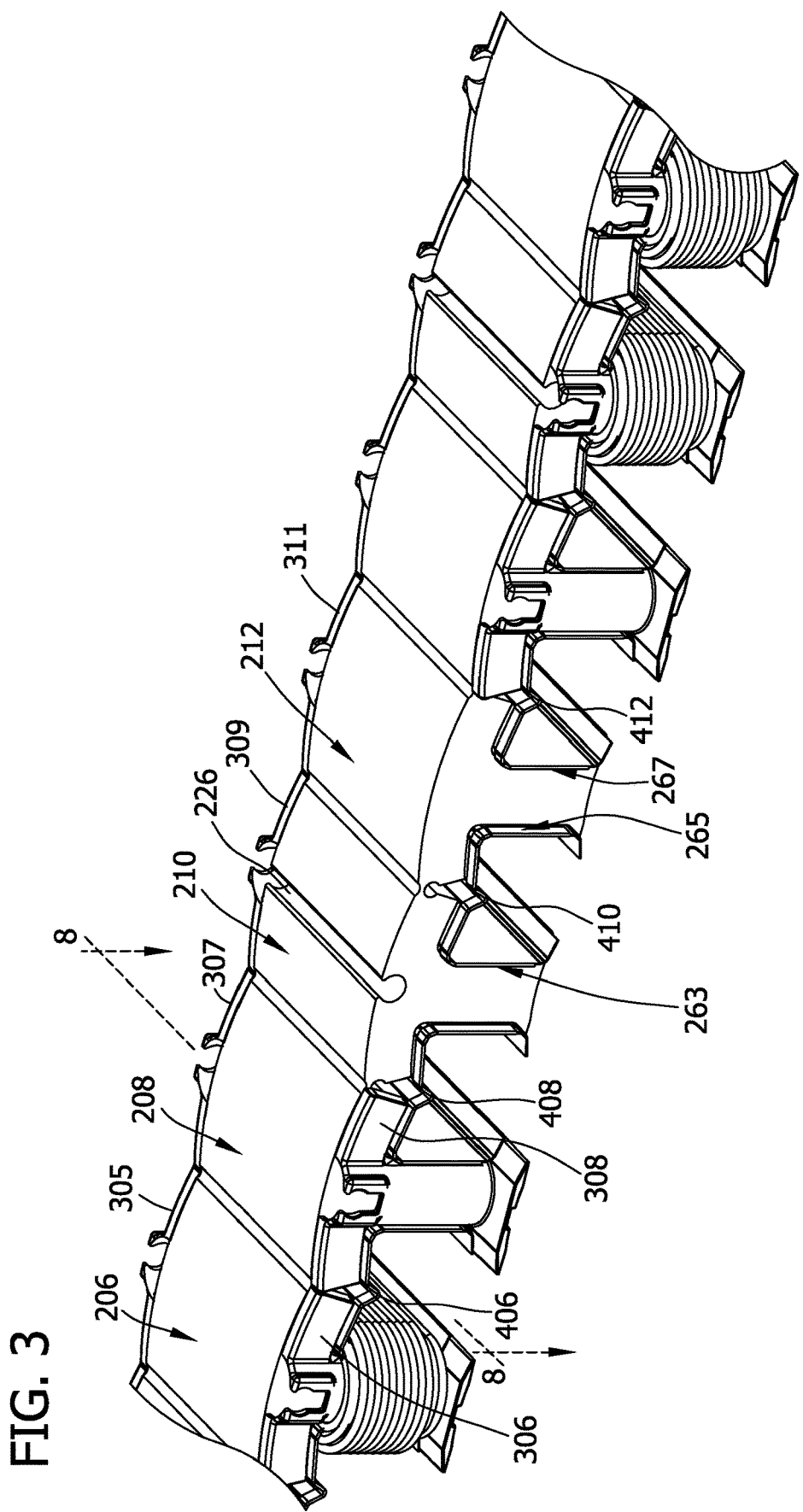
FIG. 3 is a close-up perspective view of the stator assembly shown in FIG. 1.
Figure 4:
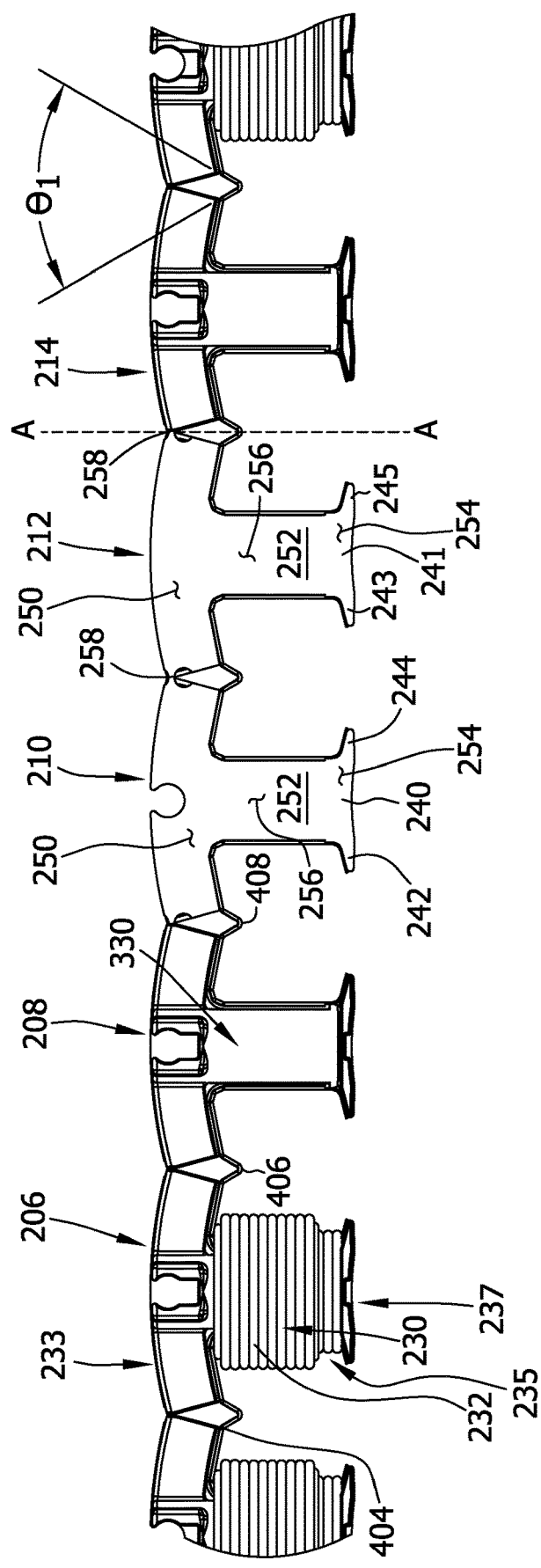
FIG. 4 is a close-up front view of the stator assembly shown in FIG. 2.

FIG. 3 is a close-up perspective view of stator assembly 100 and FIG. 4 is a close-up front view of stator assembly 100. It should be understood that end caps 310 and 312 have been removed for illustrative purposes only. In the exemplary embodiments, core 110 includes a plurality of yokes 250, a plurality of feet 254, and a plurality of teeth 252 extending therebetween. More specifically, for example, a portion of core 110 of fifth stator segment 210 includes a foot 240 having a first portion 242 and a second portion 244 extending from tooth 252 of stator segment 210, and a portion of core 110 of sixth stator segment 212 includes a foot 241 having a first portion 243 and a second portion 245 extending from tooth 252 of stator segment 212. In some embodiments, at least one of the plurality of stator segments 200 includes a through-bore 226 for receiving a through-bolt (not shown). In one embodiment, every third stator segment (e.g. stator segments 204, 210, 216, and 222) includes through-bore 226 defined within respective yokes 250. Core 110 also includes a plurality of flexible portions 258 that connect adjacent yokes 250 and are configured to enable stator assembly 100 to be arranged annularly.

Furthermore, in the exemplary embodiment, one of the plurality of insulation members 400 is positioned within the slots defined between adjacent stator segments 200. More specifically, insulation members 400 are positioned between adjacent teeth 252 of core 110. In one embodiment, insulation member 410 extends along core foot portion 244 of stator segment 210, along core tooth 252 of stator segment 210, along core yoke 250 of stator segment 210, along core yoke 250 of stator segment 212, along core tooth 252 of stator segment 212, and along core foot portion 243 of stator segment 212. As such, insulation member 410 spans slot 270 defined between stator segments 210 and 212.

In some embodiments, insulation members 400 are coupled to end caps 300. For example, in the exemplary embodiment, insulation member 406 is coupled to first end caps 305 and 307, and to second end caps 306 and 308 such that each end cap 300 is positioned between an end face 256 of core 110 and winding 230. As such, portions of insulation members 404 and 406 and end caps 300 are positioned between tooth 252 and winding 230 to substantially insulate core 110.

More specifically, and using stator segment 206 for example, end caps 305 and 306 and insulation members 404 and 406 are configured to substantially cover exposed laminations of core 110 of stator segment 206. In some embodiments, end caps 305 and 306 and insulation members 404 and 406 are positioned adjacent to and insulate core tooth 252 from windings 230. In the exemplary embodiment, wire 232 is wound about core tooth 252 to form windings 230 such that end caps 305 and 306, a tooth portion 434 (shown in FIG. 7) of insulation member 406, and a tooth portion 444 (shown in FIG. 7) of insulation member 404 are positioned between core tooth 252 and wire 232. Accordingly, windings 230 extend at least partially into slots 264 and 266 and end caps 305 and 306 are shaped such that they do not extend into slots 264 and 266. Furthermore, in some embodiments, windings 230 may be positioned between yoke 250 and foot 254 of stator segment 206.

Figure 5:
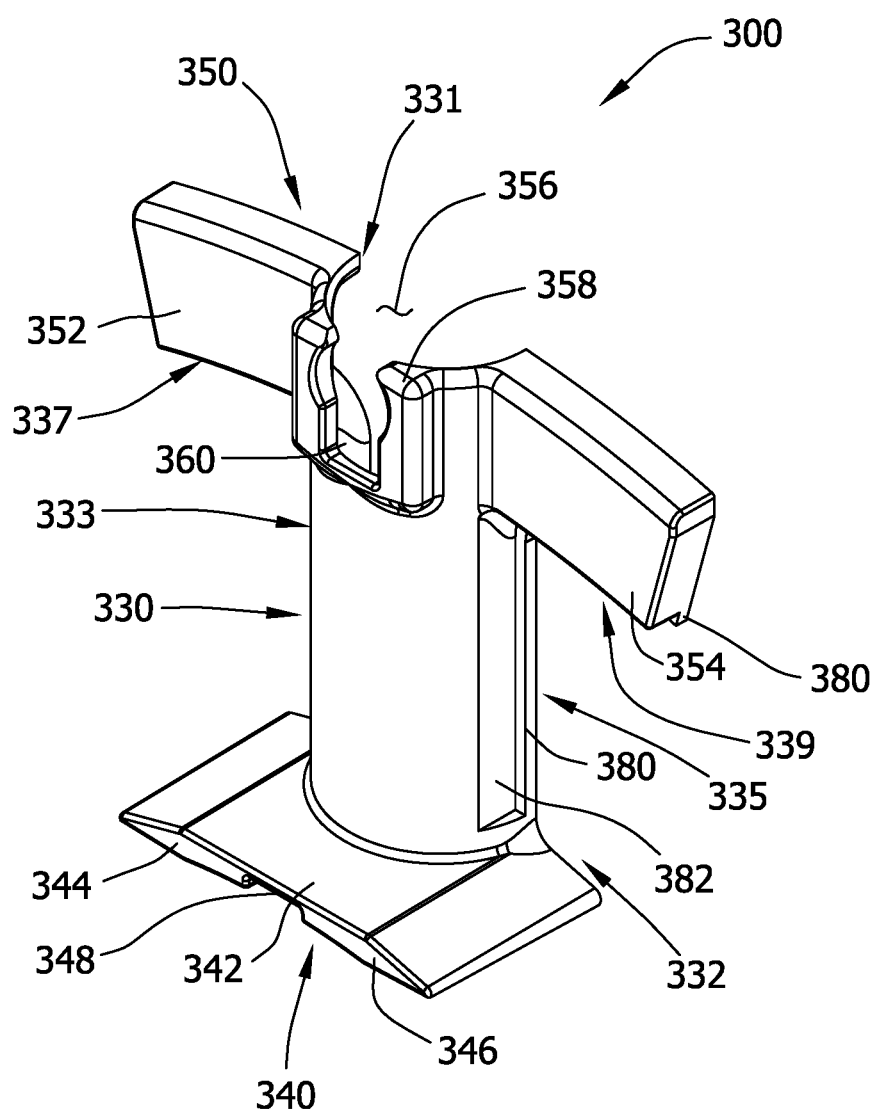
FIG. 5 is perspective view of an exemplary end cap that may be included in the stator assembly shown in FIG. 1.
Figure 6:
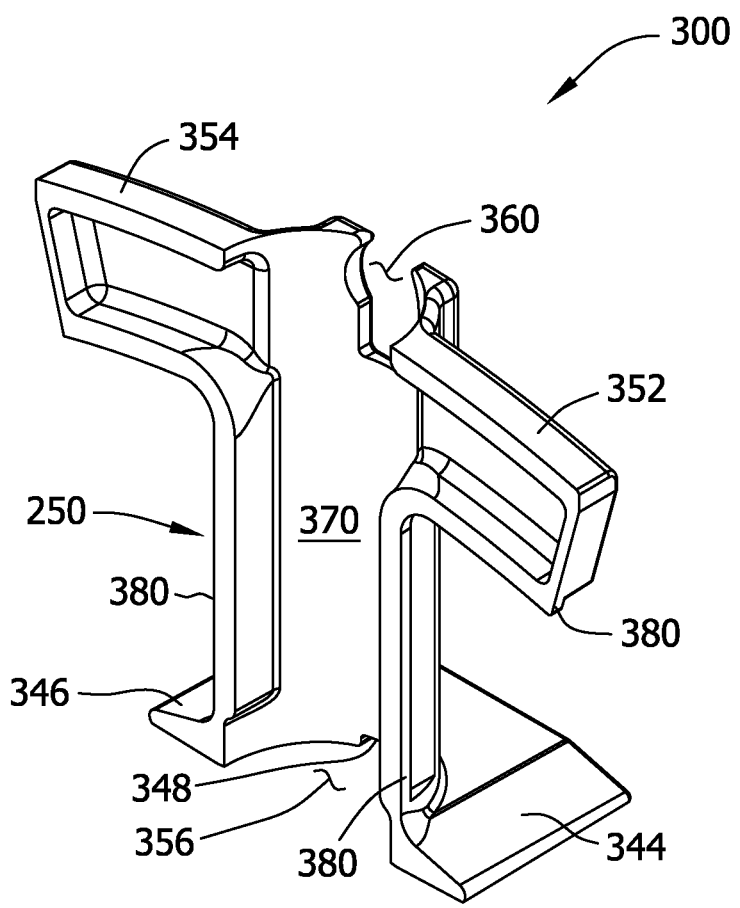
FIG. 6 is a perspective view of a second side of the end cap shown in FIG. 5.

FIGS. 5 and 6 are perspective views of end cap 300. In the exemplary embodiment, end cap 300 includes a tooth portion 330, a yoke portion 350 formed at a first end 331 of tooth portion 330, and a foot portion 340 formed at a second end 332 of tooth portion 330. Tooth portion may have any suitable shape that enables stator assembly 100 to function as described herein. For example, tooth portion 330 may have a substantially cylindrical shape that defines a semi-cylindrical cavity 356 formed therein. Furthermore, cavity 356 extends the length of tooth portion 330 from first end 331 to second end 332. Yoke portion 350 includes a first arm portion 352 that extends from tooth portion 330, a second arm portion 354 that extends from tooth portion 330, and a central portion 358 defined therebetween. In the exemplary embodiment, fastener aperture 360 is defined in central portion 358. Foot portion 340 includes a central portion 342 that is substantially rectangular in shape and oriented substantially perpendicularly to tooth portion 330. Foot portion 340 also includes a first portion 344 extending from tooth portion 330 and central portion 342, and a second portion 346 extending from tooth portion 330 and central portion 342. First portion 344 has a shape that corresponds to a shape of core foot first portion 242 (shown in FIG. 3), and second portion 346 has a shape that corresponds to a shape of core foot second portion 244 (shown in FIG. 3).

In some embodiments, a first fastening feature is included within end cap 300. For example, in the exemplary embodiment, end cap 300 includes at least one lip 380 defined along at least one of tooth portion 330 and one or both of first portion 352 and second portion 354 of yoke portion 350. In the exemplary embodiment, lip 380 extends at least partially along a first side 333 of tooth portion 330 and a second side 335 of tooth portion 330, and at least partially along a first side 337 of yoke portion 350 and a second side 339 of yoke portion 350. In one embodiment, lip 380 may extend along first and second portions 344 and 346 of foot 340. In another embodiment, lip 380 may extend at least partially along any combination of first and second sides 333 and 335 of tooth portion 330, and first and second sides 337 and 339 of yoke portion 350. Furthermore, in the exemplary embodiment, end cap 300 includes an indentation 382 defined within tooth portion 330 and arm portions 352 and 354. Indentation 382 is located on the outer edges of tooth portion 330 and arm portions 352 and 354 such that lip 380 is defined by indentation 382. Furthermore, as mentioned above, lip 380 of end caps 300 are configured such that they do not extend into and/or reduce the area of slots 262, 264, 266, 268, 270, 272, 274, 276, 278, 280, and 282.

End cap 300 may be constructed from any suitable material that enables end cap 300 to function as described herein. More specifically, end cap 300 may be constructed of any suitable non-conductive material. For example, end cap 300 may be constructed of, but is not limited to, Valox® DR51M ("Valox" is a registered trademark of Sabic Innovative Plastics of Bergen op Zoom, Netherlands).

Figure 7:
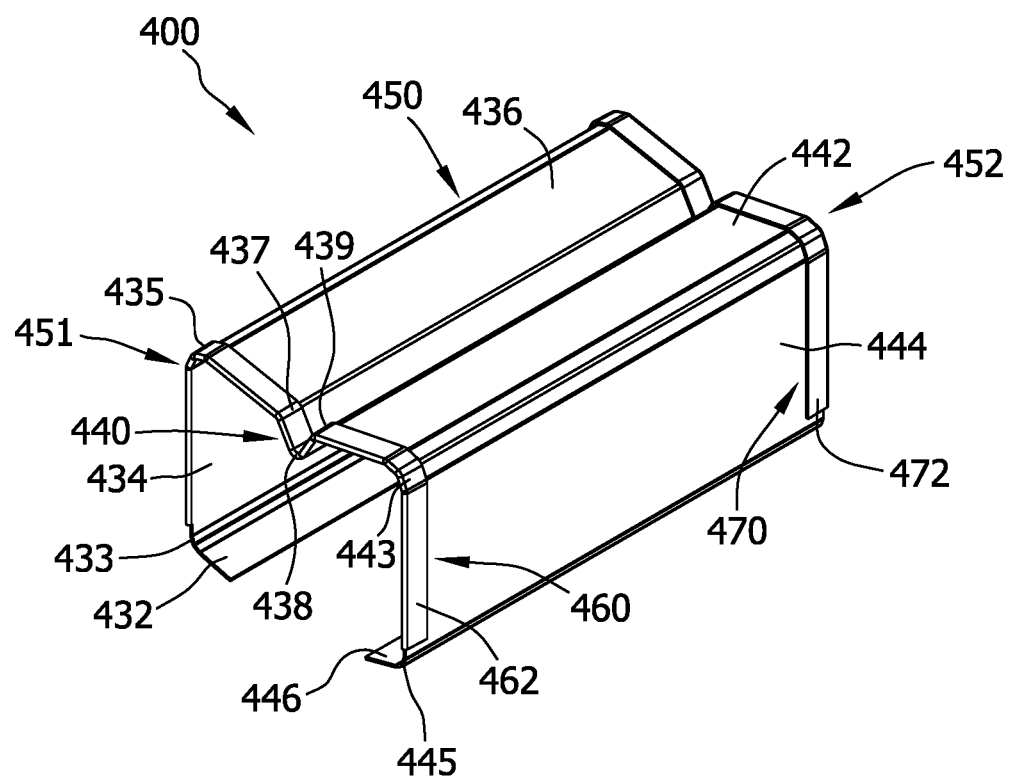
FIG. 7 is a perspective view of an exemplary insulation member that may be included in the stator assembly shown in FIGS. 1-3.

FIG. 7 is a perspective view of insulation member 400 that, in one embodiment, is be included with stator assembly 100 (shown in FIG. 1). Each insulation member 400 of stator assembly 100 is substantially the same and, as such, one insulation member 400 is described in detail herein.

Insulation member 400 may be formed from any suitable electrically insulated film or sheet material that enables insulation member 400 to function as described herein. For example, in some embodiments, insulation member 400 may be formed from a sheet of $1/1000^{th}$ inch-thickness paper, a thermoplastic material, a thermoset materials, a Dacron/Mylar/Dacron (DMD) material, and TufQUIN® having a thickness of at least 0.002 inch. In the exemplary embodiment, insulation member 400 is formed from a sheet of Mylar® polyester film ("Mylar" is a registered trademark of E. I. du Pont de Nemours and Company of Wilmington, Del.) and is substantially symmetrical with respect to a vertical plane A (shown in FIG. 3). In some embodiments, insulation member 400 formed from a sheet of Mylar® polyester film has a thickness of 0.005 inch to about 0.01 inch.

In the exemplary embodiment, insulation member 400 includes, in continuous series, a first foot portion 432, a first tooth portion 434, a first yoke portion 436, a connection portion 440, a second yoke portion 442, a second tooth portion 444, and a second foot portion 446. A first bend 433 is defined between first foot portion 432 and first tooth portion 434, a second bend 435 is defined between first tooth portion 434 and first yoke portion 436, a third bend 437 is defined between first yoke portion 436 and connection portion 440, a fourth bend 438 is defined within connection portion 440, a fifth bend 439 is defined between connection portion 440 and second yoke portion 442, a sixth bend 443 is defined between second yoke portion 442 and second tooth portion 444, and a seventh bend 445 is defined between second tooth portion 444 and second foot portion 446. Alternatively, insulation member 400 has any suitable shape that corresponds to the shape of slots 262, 264, 266, 268, 270, 272, 274, 276, 278, 280, and 282. Furthermore, alternatively, insulation members 401 and 423 (shown in FIG. 1) at the ends of stator assembly 100 are each a truncated insulation member 401 and 423, such as half of an insulation member 400.

Insulation member 400 is configured to substantially insulate core 110 of each stator segment 200 from winding 230. More specifically, tooth portions 434 and 444, yoke portions 436 and 442, and foot portions 432 and 446 are configured to insulate core 110 from winding 230. Although stator segment 212 will be described in more detail below, the following description may apply to any one of stator segments 200. In the exemplary embodiment, foot portion 432, tooth portion 434, and yoke portion 436 of insulation member 412 substantially cover surface 267 of stator segment 212, and foot portion 446, tooth portion 444, and yoke portion 442 of insulation member 410 substantially covers surface 265 of stator segment 212. In some embodiments, foot portion 432 of insulation member 412 extends past second portion 245 of foot 241 into slot 268, and foot portion 446 of insulation member 410 extends past first portion 243 of foot 241 into slot 266 to substantially insulate first and second portions 243 and 245 of foot 241. Foot portions 432 and 446 may then bend around first and second portions 243 and 245 of foot 241.

Connection portion 440 of insulation member 400 is configured to enable stator assembly 100 to be arranged in a substantially linear orientation and subsequently formed into an annular arrangement to a form a stator ring. Connection portion 440 facilitates forming stator assembly 100 into a stator ring by providing additional insulation material that flexes as the plurality of stator segments 200 are bent into the annular arrangement. More specifically, connection portion 440 includes an angle $\theta_1$ (shown in FIG. 3) that is from about 15° to about 45° when stator assembly 100 is arranged linearly. When stator assembly 100 is bent into the annular arrangement to form the stator ring, fourth bend 438 flexes such that $\theta_1$ becomes a more acute angle. For example, when stator assembly 100 is arranged annularly, angle $\theta_1$ is approximately 0°. In some embodiments, angle $\theta_1$ is dependent on the number of stator segments 200 in stator assembly 100. For example, angle $\theta_1$ is greater in a stator assembly including fewer stator segments, and angle $\theta_1$ is smaller in a stator assembly including more stator segments 200. The difference in angle $\theta_1$ is dependent on the degree in which connection portion 440 must bend when stator assembly 100 is arranged annularly to form a stator ring.

Insulation member 400 also includes a second fastening feature configured to engage the first fastening feature of end cap 300. In the exemplary embodiment, insulation member 400 includes a body 450 having a first end 451 and a second end 452. The second fastening feature includes a first flap 462 extending from first end 451 of body 450 and a second flap 472 extending from second end 452 of body 450. First flap 462 is configured to form a first cuff 460 at first end 451, and second flap 472 is configured to form a second cuff 470 at second end 452. In the exemplary embodiment, cuffs 460 and 470 extend along tooth portion 434, yoke portion 436, connection portion 440, yoke portion 442, and tooth portion 444. In an alternative embodiment, cuffs 460 and 470 may extend along foot portions 432 and 446 such that cuffs 460 and 470 engage with lip 380 that extends along first and second portions 344 and 348 of foot 340. Flaps 462 and 472 and cuffs 460 and 470 are substantially similar and, as such, first flap 462 and first cuff 460 are described in more detail below. However, it should be understood that such a description may also apply to second flap 472 and second cuff 470.

Figure 8:
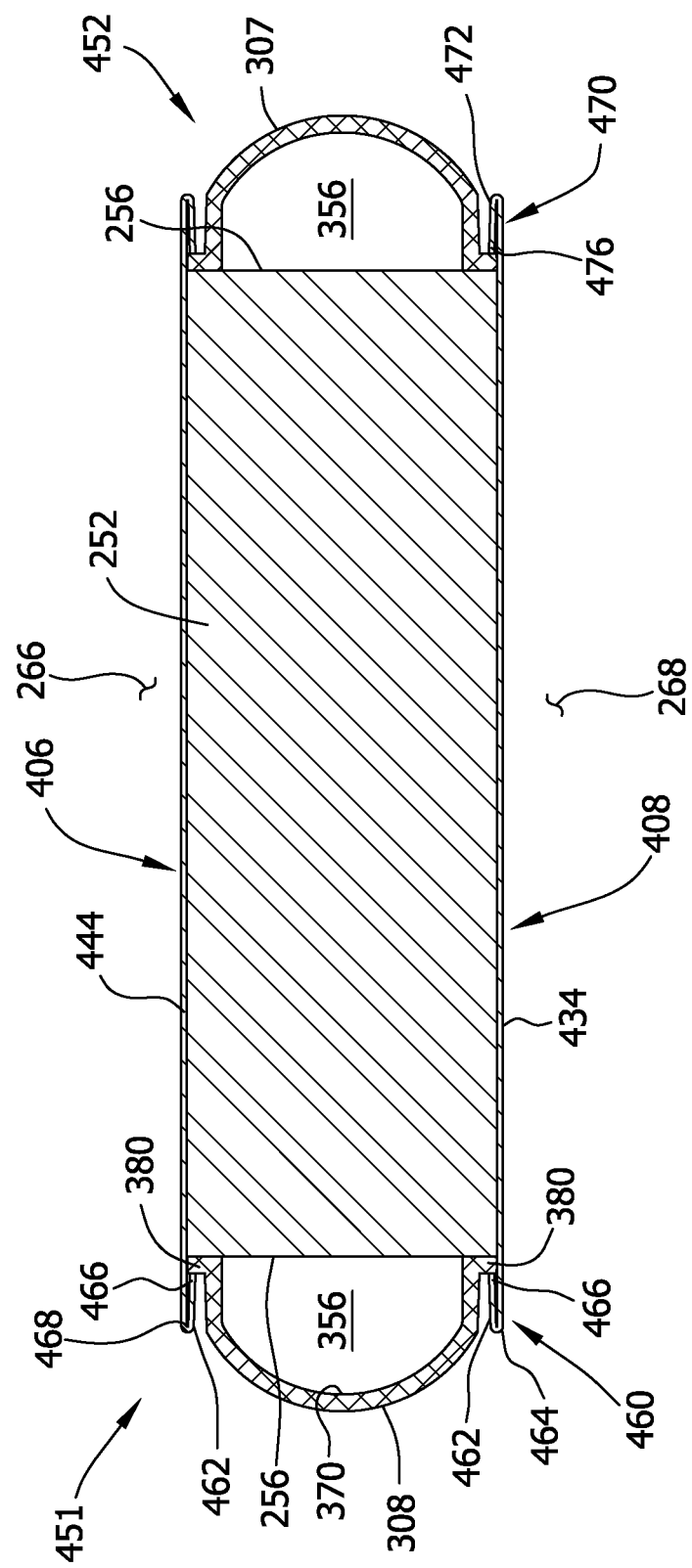
FIG. 8 is a cross-sectional view of the stator assembly shown in FIG. 3 taken at line 8-8.

FIG. 8 is a cross-sectional view of fourth stator segment 208 taken at line 8-8. In the exemplary embodiment cuff 460 includes flap 462 that extends from first end 451 and is folded over body 450. As such, a crease 468 is formed between flap 462 and body 450 at first end 451. Crease 468 may be oriented such that flap 462 is positioned a distance from body 450, or flap 462 may be oriented such that an end 466 of flap 462 contacts body 450. In the exemplary embodiment, cuff 460 is not formed along foot portions 432 and 446. In an alternative embodiment, flap 462 extends along body 450 at any suitable portions of insulation member 400. Furthermore, in the exemplary embodiment, when flap 462 is folded over body 450, flap 462 extends along at least a portion of the length of body 450, the length being between first end 451 and second end 452.

Furthermore, in the exemplary embodiment, end caps 307 and 308 are positioned adjacent to each end face 256 of core 110 such that cavity 356 is defined between an inner surface 370 of each end cap 307 and 308 and each end face 256. First cuff 460 couples to lip 380 of first end cap 308 to secure insulation members 406 and 408 to end cap 308 and end face 256. More specifically, end 466 of flap 462 contacts lip 380. Cuff 460 can flex at bend 464 to increase a distance between end 466 and body 450 to facilitate coupling insulation member 400 to end cap 308 and/or to tooth 252 (shown in FIG. 4). When coupled to end caps 307 and 308 and/or tooth 252, cuffs 460 and 470 secure insulation members 400 in place as wire 232 is wound about core tooth 252 to form winding 230 (shown in FIG. 4).

Figure 9:
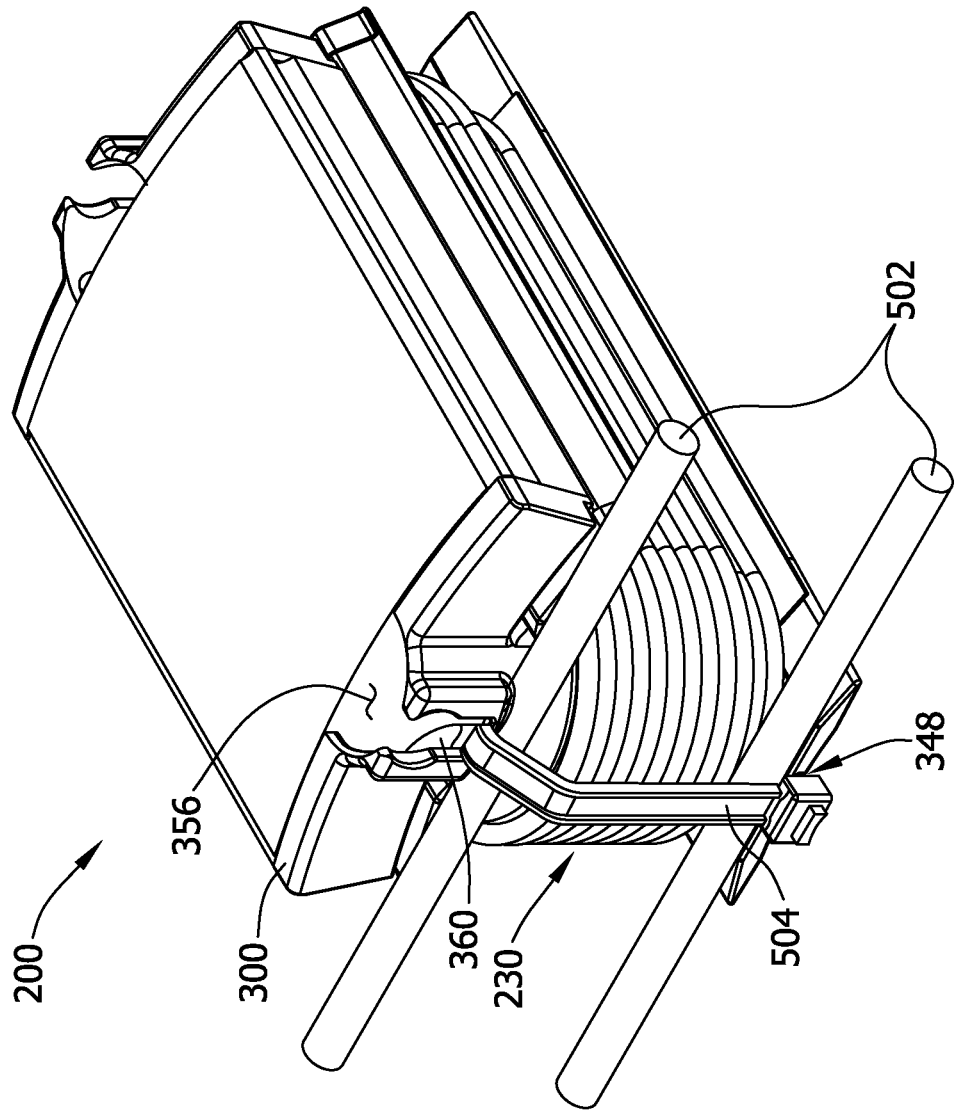
FIG. 9 is a perspective view of an exemplary stator segment that may be included in the stator assembly shown in FIG. 1.

FIG. 9 is a perspective view of an exemplary stator segment 200. In the exemplary embodiment, stator segment 200 includes lead wires 502 and a tie member 504. Lead wires 502 extend along the length of stator assembly 100 (shown in FIG. 1) and tie member 504 is used to secure lead wires 502 to end cap 300. For example, in some embodiments, tie member 504 circumscribes end cap 300 and is tightened to secure lead wires 502 to end cap 300 and/or winding 230. More specifically, tie member 504 engages with fastener aperture 320 of central portion 358 and a notch 348 of foot portion 340 when tie member 504 circumscribes end cap 300. In the exemplary embodiment, tie member 504 is a zip-tie, but tie member 504 may be any suitable component for securing lead wires 502 to end cap 300 and/or winding 230. Moreover, in the exemplary embodiment, fastener aperture 360 and notch 348 are sized such that tie member 504 is fixedly coupled to end cap 300. Fastener aperture 360 is also shaped to receive a through-bolt (not shown).

Figure 10:
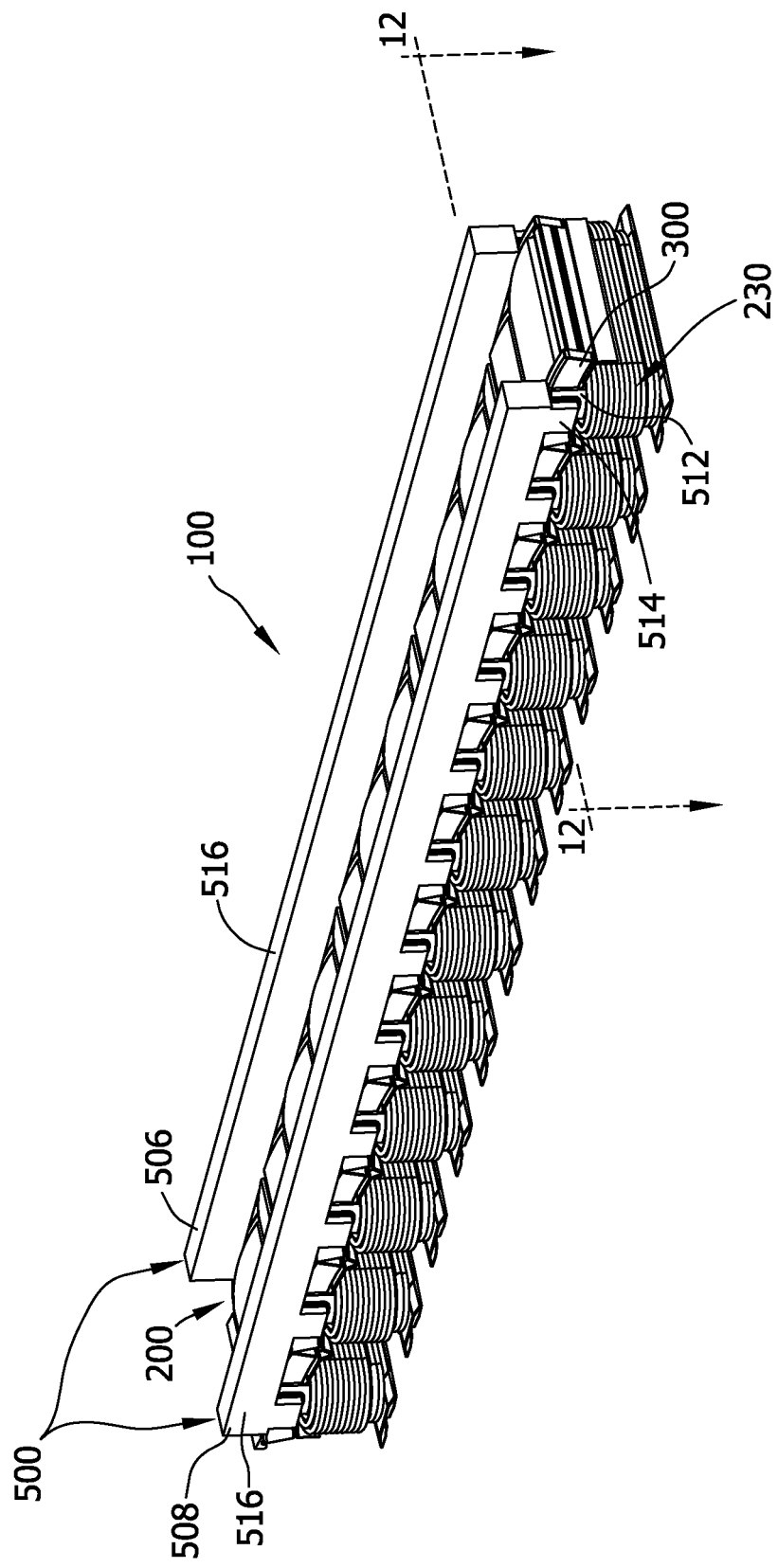
FIG. 10 is a perspective view of the stator assembly shown in FIG. 1 and an exemplary tool for use in assembling the stator assembly.
Figure 11:
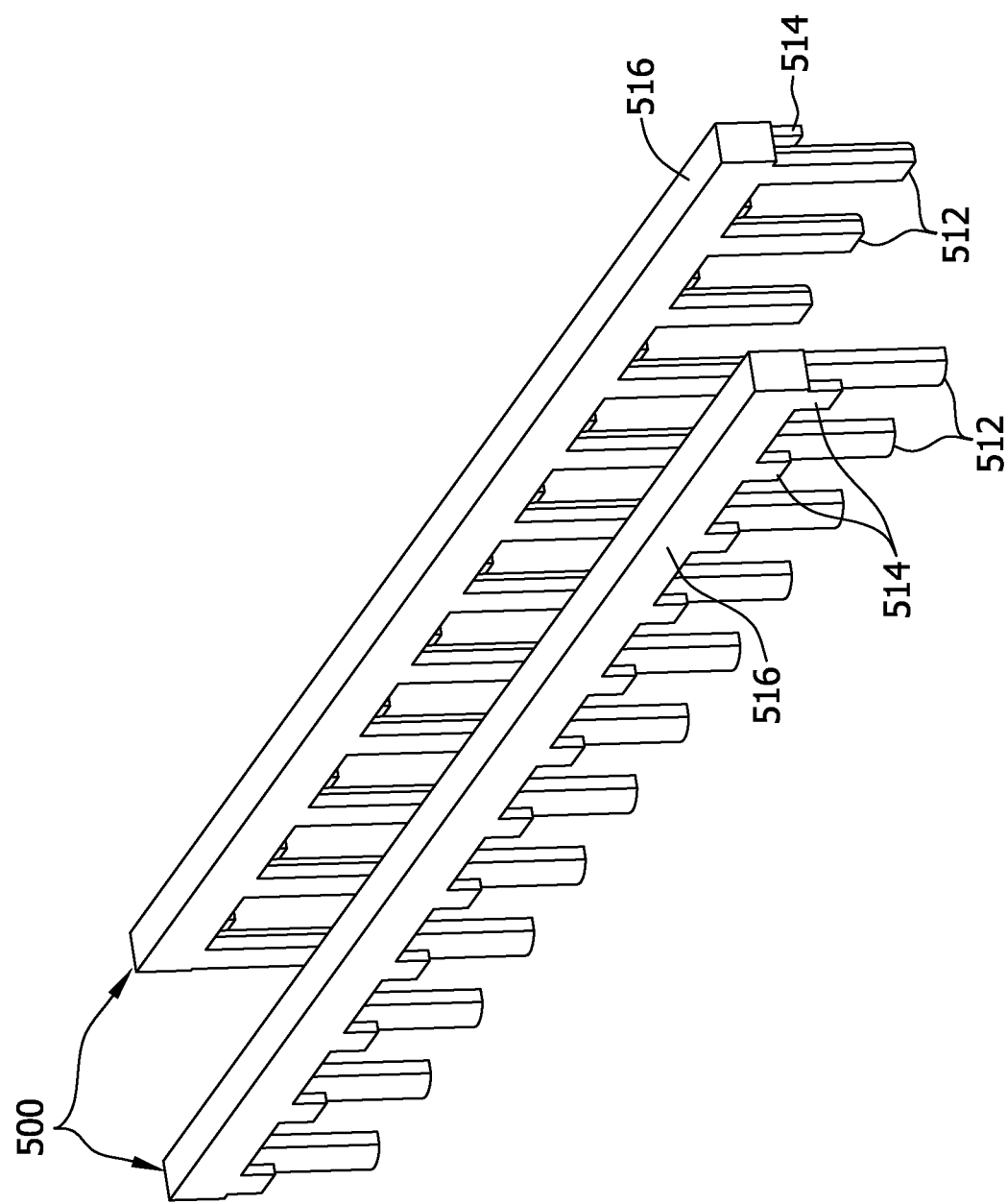
FIG. 11 is a perspective view of the tool shown in FIG. 9.
Figure 12:
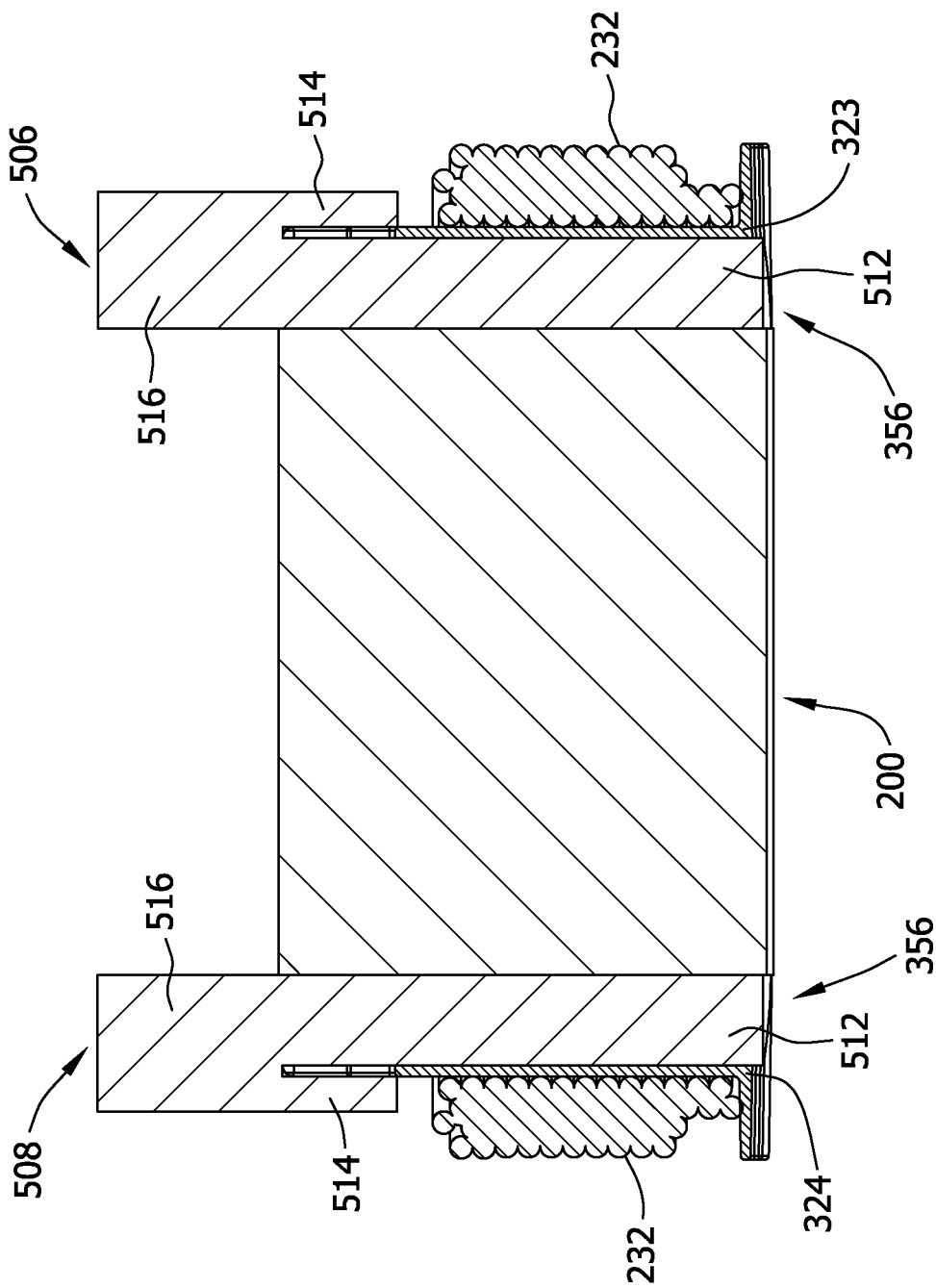
FIG. 12 is a cross-sectional view of the stator assembly shown in FIG. 10 taken at line 12-12.

FIGS. 10-12 are exemplary embodiments of stator assembly 100 assembled with tools 500. In the exemplary embodiment, a first tool 506 is inserted into first end caps 301, 303, 305, 307, 309, 311, 313, 315, 317, 319, 321, and 323 and a second tool 508 is inserted into second end caps 302, 304, 306, 208, 310, 312, 314, 316, 318, 320, 322, and 324. First and second tools 506 and 508 align the plurality of end caps 300 with each end face 256 of core 110. Tools 500 include a plurality of first members 512 and a plurality of second members 514 that each extend from a body 516 of first and second tools 506 and 508. Furthermore, in the exemplary embodiment, first members 512 and second members 514 are aligned with each other and are equally spaced along the length of body 516 such that each member 512 and 514 aligns with each end face 256.

Tools 500 align each respective end cap 300 to be positioned adjacent each respective end face 256 by inserting first member 512 into cavity 356. First member 512 is configured to have a shape corresponding to the shape of cavity 356. For example, in the exemplary embodiment, tooth portion 330 has a substantially round shape and cavity 356 has a semi-circular cross-sectional shape. As such, first member 512 has a semi-circular cross-sectional shape. Moreover, in the exemplary embodiment cavity 356 is sized to receive a portion of tie member 504 and first member 512.

FIG. 12 is a cross-sectional view of stator segment 224. In the exemplary embodiment, tool 508 is inserted into end cap 324 by inserting first member 512 into cavity 356 adjacent inner surface 370 of tooth portion 330. Second member 514 is coupled to end cap 324 and is positioned on an opposite side of tooth portion 330. As such, second member 514 holds end cap 324 in place while wire 232 is wound about each tooth assembly 236. Once winding 230 is in place, tools 510 are removed and stator assembly 100 is arranged annularly to form a stator ring.

The end cap described herein facilitates insulating a stator core from electrical conductivity and has a rounded shape to decrease the amount of force required to wind wire about each stator segment. The substantially rounded shape of the end cap results in a cavity being formed between the end cap and the stator core. The cavity receives a first member of a tool that is used to align each end cap with the each core end face. As such, wire may be wound about each stator segment without having to individually align each end cap. Furthermore, the end cap described herein includes a lip feature that may be used in combination with a cuff of an insulation member to press the end cap against each end face. As such, the end cap remains stationary to facilitate assembling the stator assembly.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of assembling a stator assembly including a plurality of stator segments, each stator segment including at least a portion of a core and at least one end cap, wherein the core includes a tooth having at least one end face, each stator segment end cap including a yoke portion and a tooth portion, the stator assembly assembled using a tool including an elongated body, a plurality of first members extending from a first side of the elongated body and a plurality of second members extending from a second side of the elongated body, the pluralities of first members and second members arranged to define a plurality of member pairs, each member pair including a first member and a second member, the plurality of member pairs defined along a length of the elongated body, said method comprising:

engaging the tool with the at least one end cap such that each end cap is positioned between the first member and the second member of a member pair;

aligning the at least one end cap with the at least one end face of each stator segment using the tool; and winding wire about the core tooth such that the at least one end cap is positioned between the at least one end face and the wire.

2. The method in accordance with claim 1, wherein the at least one end cap is contoured to define a cavity therein, wherein engaging the tool with the at least one end cap further comprises translating the tool relative to the at least one end cap such that the first member is inserted into the cavity and such that the second member is coupled to the at least one end cap.

3. The method in accordance with claim 2, wherein translating the tool further comprises inserting the first member having a shape corresponding to a shape of the cavity.

4. The method in accordance with claim 1, wherein the stator assembly includes a plurality of teeth and a plurality of end caps, wherein aligning the at least one end cap further comprises aligning the plurality of end caps with each respective end face of the plurality of teeth with a plurality of first members and a plurality of second members spaced along a length of the tool.

5. The method in accordance with claim 4 further comprising translating the tool relative to the plurality of end caps such that the plurality of first members and the plurality of second members are engaged with the plurality of end caps simultaneously.

6. The method in accordance with claim 1 further comprising securing a lead wire to at least one of the wire and the at least one end cap.

7. The method in accordance with claim 1 further comprising:

removing the tool from the at least one end cap; and arranging the plurality of stator segments annularly to form a stator ring.

8. A tool for use in assembling a stator assembly of an electrical machine, said tool comprising:

an elongated body;

a plurality of first members extending from a first side of said elongated body; and a plurality of second members extending from a second side of said elongated body, wherein said plurality of first members and said plurality of second members are aligned with each other along a length of said elongated body to define a plurality of member pairs, each member pair including a first member and a second member, said plurality of member pairs defined along the length of said elongated body, wherein said first and second members in each member pair are spaced from each other such that a gap is defined therebetween.

9. The tool in accordance with claim 8, wherein said plurality of first members and said plurality of second members are oriented parallel relative to each other.

10. The tool in accordance with claim 8, wherein said plurality of first members and said plurality of second members are both equally spaced along the length of said elongated body.

11. The tool in accordance with claim 8, wherein said plurality of first members and said plurality of second members are oriented perpendicularly relative to the length of said elongated body.

12. The tool in accordance with claim 8, wherein said plurality of first members have a semi-circular cross-sectional shape.

13. The tool in accordance with claim 8, wherein said plurality of first members extend a greater distance from said elongated body than said plurality of second members.

14. A method of assembling a stator assembly including a plurality of stator segments and a plurality of end caps, wherein at least one end cap is configured to be aligned with each stator segment, said method comprising:

engaging a tool with the at least one end cap, the tool including an elongated body, and a plurality of first members and a plurality of second members extending from the elongated body and arranged to define a plurality of member pairs, each member pair including a first member and a second member, the plurality of member pairs defined along a length of the elongated body such that the at least one end cap is positioned between the first member and the second member of a member pair;

aligning the at least one end cap with the at least one end face of each stator segment using the tool; and winding wire about the core tooth such that the at least one end cap is positioned between the at least one end face and the wire.

* * * * *